United States Patent [19]

Pirson et al.

[11] 4,338,217

[45] Jul. 6, 1982

[54] ANTIFOAMS

[75] Inventors: Ewald Pirson, Burghausen; Jakob Schmidlkofer, Mehring-Öd; Ernst Innertsberger, Burghausen, all of Fed. Rep. of Germany

[73] Assignee: Wacker-Chemie GmbH, Munich, Fed. Rep. of Germany

[21] Appl. No.: 115,162

[22] Filed: Jan. 24, 1980

[30] Foreign Application Priority Data

Jan. 31, 1979 [DE] Fed. Rep. of Germany ....... 2903725

[51] Int. Cl.$^3$ ............................................. B01D 19/04
[52] U.S. Cl. .................................... 252/358; 252/321
[58] Field of Search ................................ 252/321, 358

[56] References Cited

U.S. PATENT DOCUMENTS 2,462,999  3/1949  Scott, Jr. .............................. 252/321
2,643,240  6/1953  Walton et al. ................... 252/321 X
3,408,306  10/1968  Boylan ................................ 252/321
3,691,091  9/1972  Koerner .......................... 252/321 X

*Primary Examiner*—Richard D. Lovering

[57] ABSTRACT

Antifoams containing an organopolysiloxane and a solid dispersed in said organopolysiloxane, in which at least a portion of the organopolysiloxane is an organopolysiloxane which has a viscosity of from 5 to 40 mm$^2$.s$^{-1}$ at 25° C. and contains on the average at least 0.5 alkoxy groups per Si-atom and has an SiC-bonded monovalent hydrocarbon radical linked to each silicon atom.

2 Claims, No Drawings

4,338,217

ANTIFOAMS

The present invention relates to antifoams and more particularly to antifoams which are very effective in suppressing or preventing foam formation in aqueous systems.

BACKGROUND OF THE INVENTION

An antifoam composition which has been used heretofore to suppress or prevent foam formation in aqueous systems is described in British Pat. No. 1,228,799 to Wacker-Chemie GmbH. This British Patent describes an antifoam composition containing a mixture of an organopolysiloxane, a finely divided inorganic filler and a magnesium, aluminum, calcium, zinc or scandium salt of an aliphatic monobasic carboxylic acid or hydroxycarboxylic acid having from 12 to 22 carbon atoms. Antifoam compositions which contain organosilicon compounds containing hydrocarbonoxy groups are disclosed in U.S. Pat. No. 2,462,999 to Scott. Also, U.S. Pat. No. 2,643,240 to Walton et al discloses an antifoam containing an organopolysiloxane having SiC-bonded monovalent radicals. Also, U.S. Pat. No. 2,416,503 to Trautman et al discloses antifoams which contain organosilicon oxide condensation products composed primarily of silicon atoms linked through oxygen atoms, in which at least one organic radical is attached either directly or through an oxygen atom to each silicon atom.

In comparison to the antifoams described in the above cited patents, the antifoams which are the subject of this invention are easier to prepare than the organopolysiloxanes having an average of two monovalent hydrocarbon radicals linked to each silicon atom and surprisingly the antifoams of this invention are just as effective as the diorganopolysiloxanes used heretofore. Moreover, the antifoams of this invention are more stable for longer periods of time without any apparent separation. Furthermore, the antifoams of this invention are more effective and can be easily combined with organic materials which are used as emulsifiers and/or alcohols and are more readily dispersed in an aqueous system.

Therefore, it is an object of this invention to provide an antifoam which is more effective in suppressing and/or preventing foam formation. Another object of this invention is to provide an antifoam which is stable over a longer period of time. Still another object of this invention is to provide an antifoam which is readily combined with emulsifiers and is easily dispersed in aqueous systems.

SUMMARY OF INVENTION

The foregoing objects and others which will become apparent from the following description are accomplished in accordance with this invention, generally speaking, by providing antifoams containing an organopolysiloxane and a solid dispersed in the organopolysiloxane in which at least a portion of the organopolysiloxane is an organopolysiloxane which has a viscosity of from 5 to 40 $mm^2.s^{-1}$ at 25° C. and contains on the average at least 0.5 alkoxy groups per silicon atom and has an SiC-bonded monovalent hydrocarbon radical linked to each silicon atom.

DETAILED DESCRIPTION OF THE INVENTION

The solids incorporated in the antifoams of this invention are often referred to as "fillers", and they may be the same solids which have been or could have been used heretofore in organopolysiloxane based antifoams. Examples of such fillers or solids which may be incorporated into the organopolysiloxane-based antifoams of this invention are oxides of silicon, magnesium or zinc, having preferably a maximum particle size of 25 micron, such as, for example pyrogenically produced or precipitated silicon dioxide, salts relating to the second or the third group of the Periodic Table according to Mendeleef, having a Periodic Number of from 12 to 30, such as salts of aliphatic monobasic carboxylic acids or hydroxycarboxylic acids having from 12 to 22 carbon atoms, such as calcium stearate and calcium-12-hydroxystearate, as well as products which remain in the solid state at least at the temperature at which the antifoams are to be used. Examples of products which are solid at the temperature at which they are used are those obtained from the reaction of at least one monovalent or polyvalent isocyanate with an organic compound containing at least one hydrogen atom which is capable of reacting with the isocyanate group, such as the product obtained by reacting naphthalene diisocyanate with cyclohexylamine. It is preferred that the product obtained from the reaction of a compound containing a hydrogen atom and the isocyanate be prepared in the presence of the organopolysiloxane used in the antifoams. Additional examples of solids which may be used in the antifoams of this invention are lithium stearate, magnesium silicate, and magnesium aluminum silicate. All of the inorganic fillers may be either hydrophobic, i.e., they may have trimethylsiloxy groups on their surface, or they may be hydrophilic.

If desired, mixtures of various solids may be dispersed in the organopolysiloxane.

The amount of solids dispersed in the organopolysiloxane is preferably from about 0.1 to 30 percent by weight and more preferably from 0.2 to 20 percent by weight, based on the weight of the organopolysiloxane used.

It is preferred that the organopolysiloxane used in this invention contain at least 0.5 alkoxy groups per Si-atom and the monovalent hydrocarbon radical is bonded to each silicon atom with an SiC-bond. Moreover, it is preferred that the organopolysiloxane have a viscosity of from 5 to 40 $mm^2.^{-1}$ and more preferably from 15 to 30 $mm^2.s^{-1}$ at 25° C.

Preferably, the alkoxy groups linked to the silicon atoms of the organopolysiloxane which has a viscosity of from 5 to 40 $mm^2.^{-1}$ at 25° C. and has an SiC-bonded monovalent hydrocarbon radical linked to each silicon atom, contain from 1 to 4 carbon atoms and more preferably from 2 to 3 carbon atoms. Ethoxy groups are the preferred alkoxy groups. Other suitable alkoxy groups are the methoxy, n-propoxy, the isopropoxy, n-butoxy, sec-butoxy and the tert-butoxy groups. Various types of alkoxy groups may be present on the organopolysiloxane used in this invention.

It is preferred that the SiC-bonded, monovalent hydrocarbon radical which is bonded to each silicon atom in the organopolysiloxane having a viscosity of from 5 to 40 $mm^2.s^{-1}$ at 25° C. and having an average of at least 0.5 alkoxy groups per Si atom, have from 1 to 18 carbon atoms. Examples of such hydrocarbon radicals are the methyl, ethyl and 2-phenylpropyl radicals, as well as octadecyl radicals. However, because of their availability, it is preferred that 90 percent and possibly 100 percent of the number of SiC-bonded monovalent hydrocarbon radicals in the organopolysiloxane having a viscosity of from 5 to 40 mm$^2$.s$^{-1}$ at 25° C. and an average of at least 0.5 alkoxy groups per Si-atom, by methyl radicals. Moreover, it is preferred that in the organopolysiloxane having a viscosity of from 5 to 40 mm$^2$.s$^{-1}$ at 25° C. and containing at least 0.5 alkoxy groups per silicon atom and an SiC-bonded monovalent hydrocarbon radical linked to each silicon atom, that all unsaturated silicon valences or all silicon valences which are saturated by other than alkoxy groups or SiC-bonded hydrocarbon radicals be saturated by siloxane oxygen atoms, and that on the average no more than 1.4 alkoxy groups be present for each Si atom. The preferred organopolysiloxanes which have a viscosity of from 5 to 40 mm$^2$.s$^{-1}$ at 25° C. and have an average of at least 0.5 alkoxy groups per Si atom and has an SiC-bonded monovalent hydrocarbon radical linked to each silicon atom, have units of the formula:

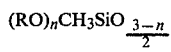

wherein R is an alkyl radical having from 1 to 4 carbon atoms, n is 0, 1 or 2, and on the average from 0.5 to 1.4

The organopolysiloxane used in accordance with this invention which has a viscosity of from 5 to 40 mm$^2$.s$^{-1}$ at 25° C., and which contains an average of at least 0.5 alkoxy groups per Si atom and has an SiC-bonded monovalent hydrocarbon radical linked to each silicon atom, may be linear, cyclic and/or branched.

The organopolysiloxane described above may be prepared by any method known in the art for preparing these compounds, such as by reacting, for example, methyltrichlorosilane with for example, a mixture of ethanol and water in the necessary ratio to impart the desired viscosity to the organopolysiloxane. Also, methyltriethoxysilane may be hydrolyzed in a mixture of ethanol and water in the quantity necessary to form an organopolysiloxane having the desired viscosity. The hydrolysis or condensation may take place in the presence of a hydrolysis or condensation catalyst, such as hydrochloric acid.

The antifoams may contain in addition to the organopolysiloxane having a viscosity of from 5 to 40 mm$^2$.s$^{-1}$ at 25° C. and having at least 0.5 alkoxy groups per Si atom and having an SiC-bonded monovalent hydrocarbon radical linked to each silicon atom, and the finely dispersed solid, other agents which could have been or have been used heretofore for preparing antifoams based on an organopolysiloxane and a solid dispersed in said organopolysiloxane. Examples of other agents which may be present in the antifoams of this invention are other organopolysiloxanes which exhibit antifoam properties, such as trimethylsiloxy enblocked dimethylpolysiloxanes, water-soluble liquids other than organopolysiloxanes which exhibit antifoam properties, such as mineral oils, vegetable oils, orthophosphoric acid esters, esters of carboxylic acids and monovalent alcohols, such as isopropyl myristate, di-n-butyladipate, di-n-butyl sebacate, tridecyl stearate, isooctadecyl stearate and di-2-ethylhexyladipate. Furthermore, the antifoams may be mixed with alkanols having from 2 to 18 carbon atoms, such as ethanol, isopropanol, isobutanol, 2-ethylhexanol or isotridecyl alcohol, or they may be present with mixtures of such alkanols.

The antifoams of this invention may also be mixed with an emulsifier and/or protective colloid. Examples of suitable emulsifiers are nonionic emulsifiers, such as the addition products of ethylene oxide and alcohols, phenols, carboxylic acids or amines, such as for example, isotridecylpolyoxyethylene glycol ether, stearyl polyoxyethylene glycol ether, cetylpolyoxyethylene glycol ether, trimethylnonylpolyoxyethylene glycol ether or nonylphenolpolyoxyethylene glycol ether and sorbitan monostearate. Additional examples of suitable emulsifiers are anionic active emulsifiers such as sulfonates and salts of sulfonic acids, including salts of esters of aliphatic carboxylic acids having at least 9 carbon atoms, such as isethionic acid, e.g., the sodium salt of stearoyl isethionic acid. Examples of suitable protective colloids are polyvinyl alcohols which may contain up to 40 mole percent of acyl groups, especially acetyl groups, methyl cellulose and sodium carboxyethylcellulose. An example of a combination comprising an emulsifier and a protective colloid is the combination of sodium carboxyethylcellulose and the sodium salt of stearoyl isethionic acid. When the antifoams of this invention are present as a mixture with an emulsifier and/or a protective colloid, then the total quantity of emulsifier and protective colloid should preferably be from about 1 to 20 percent by weight and more preferably from 8 to 12 percent by weight based on the total weight of the antifoam composition.

In addition to the previously described method for preparing a reaction product of an isocyanate with an organic compound containing at least one hydrogen atom which is capable of reacting with the isocyanate group in the presence of the organopolysiloxane used in the antifoams of this invention, antifoams of this invention may be prepared by mixing the ingredients in any sequence. For example, they may be prepared by mixing the organopolysiloxane having a viscosity of from 5 to 40 mm$^2$.s$^{-1}$ at 25° C. which has a solid dispersed therein with such other additives as have been or may be employed in the antifoam of this invention. When an emulsifier and especially a liquid emulsifier is used, there is no need to use water in the preparation of a separate emulsion.

The organopolysiloxanes containing ethoxy groups and having SiC-bonded methyl radicals which are used in the Examples are prepared in the following manner:

(A) A mixture containing 80 g of ethanol, 120 ml of water and 0.8 ml of concentrated hydrochloric acid was added dropwise to 1.5 kg of methyltriethoxysilane which had been heated to 90° C. Simultaneously and within a total of 90 minutes, the ethanol was distilled off while continuing to agitate. The residue was neutralized with the addition of ammonia and then filtered. A clear liquid having a viscosity of 25 mm$^2$.s$^{-1}$ at 25° C. was obtained.

(B) The process described in (A) above was repeated, except that only 100 ml of water was used. A clear liquid having a viscosity of 15 mm$^2$.s$^{-1}$ at 25° C. was obtained.

EXAMPLE 1

An automatic stirring apparatus is used to mix 5 kg of an organopolysiloxane having a viscosity of 25 mm$^2$.s$^{-1}$ at 25° C. and having an average of about 1 ethoxy group per Si atom, in which an SiC methyl radical is bonded to each silicon atom and all the silicon valences which are not saturated by ethoxy groups and SiC-bonded methyl radical are saturated by siloxane oxygen atoms, and 4 kg of silicon dioxide which was pyrogenically prepared in the gaseous phase and which has a BET surface area of 200 m²/g. After mixing for about 30 minutes, a soft paste is obtained which after storing for 4 weeks shows no evidence of any change.

EXAMPLE 2

The procedure described in Example 1 is repeated, except that 4 kg of a silicon dioxide having a BET surface area of 150 m²/g which has been previously treated with trimethylchlorosilane to render it hydrophobic is substituted for the lipophilic silicon dioxide used in Example 1. A viscous mass is obtained which shows no evidence of any change even after being stored for 4 weeks.

EXAMPLE 3

A mixture containing 780 g of an organopolysiloxane having on the average about 1 ethoxy group for each Si atom and a methyl radical is bonded to each silicon atom with an SiC-bond and all silicon valences which are not saturated by ethoxy groups and SiC-bonded methyl radicals are saturated by siloxane oxygen atoms and having a viscosity of 15 mm².s⁻¹ at 25° C., and 11 g of naphthylene diisocyanate are heated to 150° C. under constant agitation in a 1 liter round bottom flask equipped with a paddle agitator. About 11.5 g of cyclohexylamine is then added to the mixture with agitation. After cooling, a white dispersion of solid particles measuring less than 25 microns is obtained. Even after storing for over 4 weeks, the product shows no evidence of any change.

COMPARISON EXAMPLE (A)

The process described in Example 1 is repeated, except that 5 kg of methyltriethoxysilane is substituted for the organopolysiloxane. The liquid obtained separates into two components within a period of 6 hours.

COMPARISON EXAMPLE (B)

The process described in Example 2 is repeated, except that 5 kg of methyltriethoxysilane is substituted for the organopolysiloxane. The liquid thus obtained separates into its component parts within a period of 6 hours.

COMPARISON EXAMPLE (C)

In order to demonstrate that the organopolysiloxanes used in accordance with this invention are surprisingly just as effective as diorganopolysiloxanes, the process described in Example 1 is repeated, except that 5 kg of a trimethylsiloxy endblocked dimethylpolysiloxane which has a viscosity of 100 mm².s⁻¹ at 25° C. is substituted for the organopolysiloxane used in Example (1). Even after storing for 4 weeks, the viscous mass obtained shows no signs of change. This Example shows that the organopolysiloxanes used in accordance with this invention are surprisingly just as effective as the diorganopolysiloxanes.

The effectiveness of the antifoams prepared in the above Examples was determined in the following manner:

A 500 ml flat-bottom flask is filled with 400 ml of a 4 percent by weight solution of sodium lauryl sulfate. Thereafter the flask is closed with a stopper and shaken 10 times. It is then entirely filled with foam. About 80 mg samples taken from the mixtures prepared in accordance with the Examples and Comparison Example (c) are sufficient to remove all of the foam within a short period of time. The mixture obtained pursuant to Comparison Example (c) was diluted with a small amount of toluene. However, when the mixtures prepared in accordance with Comparison Examples (a) and (b) were tested, 1.3 g was needed to obtain the same result.

EXAMPLE 4

About 1 kg of the mixture prepared in accordance with the procedure of Example 1 is mixed with 90 g of isotridecylpolyoxyethylene glycol ether. The resultant homogeneous mixture shows no sign of change even after being stored for 4 weeks. When added to a foamed aqueous solution, the mixture is immediately dispersed while simultaneously destroying the foam.

What is claimed is:

1. An antifoam consisting essentially of an organopolysiloxane consisting of units of the formula $$(RO)_n CH_3 SiO_{\frac{3-n}{2}}$$

in which R is an alkyl radical having from 1 to 4 carbon atoms, n has an average value of from 0.5 to 1.4 and a viscosity of from 5 to 40 mm².s⁻¹ at 25° C. and from 0.1 to 30 percent by weight based on the weight of the organopolysiloxane of a solid dispersed in said organopolysiloxane.

2. The antifoam of claim 1, wherein the organopolysiloxane which has a viscosity of at least 5 to 40 mm².s⁻¹ at 25° C. contains at least one alkoxy group per silicon atom.

* * * * *